Patented Mar. 10, 1925.

1,528,810

UNITED STATES PATENT OFFICE.

JOE OLGIERD ZDANOWICH, OF LONDON, ENGLAND.

MANUFACTURE OF CELLULOSE ACETATES AND THE LIKE.

No Drawing.  Application filed January 10, 1923. Serial No. 611,850.

*To all whom it may concern:*

Be it known that I, JOE OLGIERD ZDANOWICH, a subject of the King of Great Britain and Ireland, and residing at 36 St. James Street, London, S. W. 1, England, have invented certain new and useful Improvements in and Relating to the Manufacture of Cellulose Acetates and the like, of which the following is a specification.

This invention relates to the production of viscous solutions of cellulose, more particularly acetylated cellulose.

It is especially directed to the manufacture of acetose, that is, such acetylated cellulose whose acetylated mixture can be used directly for spinning artificial silk, horsehair, and the like or for making films without first precipitating it and then redissolving.

It is to be understood, however, that it is not limited to the manufacture of acetose but is applicable also to solutions of cellulose compounds in organic solvents generally and also to the production of viscose, that is cellulose xanthogenate, these being referred to herein as viscous solutions of cellulose.

The invention is more particularly described in connection with the production of acetose. In the preparation of this material the invention may be employed in those cases where a weak condensing agent or condensing agents is or are used without a strong condensing agent in addition, or where no condensing agent is used in one stage followed by a small quantity of a strong condensing agent. In the first case the weak condensing agents mentioned in my prior British Patent No. 139,232 may be employed or others such as acetyl sulphuric acid, alkyl amines, such as methyl amine, aniline salts, sulphonic acid, phosphorous trichloride, pyridine, alkyl sulphates, such as methyl sulphate, dimethylamine sulphate, hydrochloric acid. These agents may be followed or not by a strong condensing agent.

I have found that in the manufacture of such viscous solutions of cellulose there is a tendency for the solutions to become altered in the sense that the viscosity after it has been freshly made tends to change on standing, or it may even coagulate or solidify. This has a deleterious effect both on the keeping properties of the solution and on the subsequent operations involved.

The object of the present invention is to provide means for stabilizing the solutions.

I have made a number of experiments and have found that this can be effected by the use of a polymerizing agent of which the aldehyde group forms an example, especial benefits attending the use of formaldehyde.

Now formaldehyde has already been proposed for use in the manufacture of acetose according to my prior British Patent No. 139,232. In that case I showed that by the employment of formaldehyde or peroxide of hydrogen or dilute acetic acid hydrolysis of the cellulose solution could be completed for which purpose in the particular example given about 200 ccs. of formaldehyde were used to deal with 150 grams of cellulose. According to the present invention as my experiments have shown stabilization is effected by means of a much smaller quantity of formaldehyde, such an amount as in fact will give no substantial hydrolysis.

The present invention therefore primarily consists in a method of stablizing viscous solutions of cellulose and particularly acetose solutions by the employment of a comparatively small quantity of formaldehyde or the like, that is to say, such a quantity as will effect stabilization, but will not secure any substantial hydrolysis, the stabilization referred to being that which is characterized by the maintenance without substantial change during keeping of the viscosity of the liquor as made.

In carrying the invention into effect in one form by way of example into a mixture of 500 ccs. of glacial acetic acid and 420 ccs. of acetic anhydride, 150 grams of cellulose is introduced together with chlorine gas while stirring, the temperature being maintained at about 70–80° C. When action is substantially complete as is indicated by partial or complete disintegration as seen on observation, 2 grams of sulphuric acid as a strong condensing agent is added. The time which commonly must elapse before the strong condensing agent is introduced is several hours, say at least two or three hours, but this depends not only on the kind of cellulose but on the particular sample of any given kind for I find a certain amount of variation in these. The mixture is well stirred during the whole operation until at the end it changes into a clear solution directly employed for the production of threads or films by squirting or by evaporation of a thin layer as the case may be.

Now in order to effect stabilization of this solution I introduce into the mixture about 100 ccs. of formaldehyde and stir this well to effect complete homogeneity.

I have found that the solution then will remain of substantially constant viscosity, which sometimes slightly increases, for a considerable period, say for a few weeks so that both its keeping properties are improved and in addition it is more easily squirted under a constant pressure. It also improves the thread or film by imparting higher quality and increasing its strength.

The above example is given as an illustration only and may be modified, for instance, either as to the method employed for manufacturing the viscous solutions of cellulose or as to the kind or amount of stabilizing agents used.

I have suggested above that the action is due to polymerization, but whether that be the fact or not the use of an agent described, particularly formaldehyde, whether as a gas or in its ordinary commercial form, certainly does give the results I have set out. The same applies to tetrachlorethane.

Acetaldehyde or the higher members of the aldehyde group may also be employed.

Where in this specification and claims I have referred to a "polymerizing" or "stabilizing" agent this term includes all the substances referred to above which it is suggested may be employed to obtain the benefits of this invention.

Having now described my invention, what I claim as new and desire to secure by Letters Patent is:—

1. A method of stabilizing viscous acetylated cellulose acetate mixtures which consists in adding thereto a stabilizing agent in amount less than that required to produce substantial hydrolysis by such stabilizing agent.

2. A method of stabilizing acetose solutions which consists in adding thereto a stabilizing agent in amount less than that required to produce substantial hydrolysis by such stabilizing agent.

3. A method of stabilizing viscous solutions of cellulose which consists in adding a comparatively small quantity of formaldehyde.

4. A method of stabilizing solutions of cellulose esters which consists in adding thereto a commercial solution of formaldehyde in amount about equal to the weight of the cellulose.

5. The process which consists in acting on cellulose by the following reagents in substantially the proportions specified, namely, 150 gms. cellulose, 500 ccs. of glacial acetic acid and 420 ccs. of acetic anhydride in the presence of chlorine, 2 gms. of sulphuric acid subsequently being added followed by about 100 ccs. of a commercial solution of formaldehyde.

In testimony whereof I have signed my name to this specification.

JOE OLGIERD ZDANOWICH.